United States Patent
Ma et al.

(10) Patent No.: US 10,105,694 B2
(45) Date of Patent: Oct. 23, 2018

(54) COPPER-DOPED IRON METAL-ORGANIC FRAMEWORK, PREPARATION METHOD THEREOF, AND APPLICATION METHOD FOR ACTIVATION OF PERSULFATE TO TREAT ORGANIC WASTEWATER

(71) Applicant: SOUTH CHINA UNIVERSITY OF TECHNOLOGY, Guangdong (CN)

(72) Inventors: Yongwen Ma, Guangdong (CN); Meijuan Duan, Guangdong (CN); Jinquan Wan, Guangdong (CN); Yan Wang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 26 days.

(21) Appl. No.: 15/526,336

(22) PCT Filed: Dec. 10, 2016

(86) PCT No.: PCT/CN2016/109351
§ 371 (c)(1),
(2) Date: May 12, 2017

(87) PCT Pub. No.: WO2017/166864
PCT Pub. Date: Oct. 5, 2017

(65) Prior Publication Data
US 2018/0185828 A1    Jul. 5, 2018

(30) Foreign Application Priority Data
Mar. 31, 2016 (CN) .......................... 2016 1 0207408

(51) Int. Cl.
*B01J 31/16* (2006.01)
*B01J 31/22* (2006.01)
(Continued)

(52) U.S. Cl.
CPC ............ *B01J 31/1691* (2013.01); *B01J 31/22* (2013.01); *B01J 37/06* (2013.01); *B01J 37/08* (2013.01);
(Continued)

(58) Field of Classification Search
CPC ........ B01J 31/1691; B01J 31/22; B01J 37/06; B01J 37/08; B01J 2531/842; C02F 1/72;
(Continued)

(56) References Cited

U.S. PATENT DOCUMENTS

2010/0181264 A1    7/2010 Martin
2012/0149560 A1    6/2012 Lee et al.

FOREIGN PATENT DOCUMENTS

CN    101587089    11/2009
CN    104310565    1/2015
(Continued)

OTHER PUBLICATIONS

English Language Translation of CN 10-4310565 A dated Jan. 28, 2015 (obtained from Google Patents Jul. 2018) (Year: 2015).*
(Continued)

*Primary Examiner* — Lucas A Stelling
(74) *Attorney, Agent, or Firm* — JCIPRNET

(57) ABSTRACT

The present invention discloses a copper-doped iron metal-organic framework, a preparation method thereof, and an application method for activation of persulfate to treat organic wastewater. The copper-doped iron metal-organic framework is prepared by solution impregnation method, using relatively large specific surface area and more hollow structures of the iron metal-organic framework to effectively load copper ion. This method uses the unsaturated-coordinate iron active center on the iron metal-organic framework and copper ions on the load as a catalyst body, utilizing catalytic synergies of both to efficiently and continuously (Continued)

activate persulfate to produce sulfate radical anion for degradation of organic pollutants. This method is suitable for various organic wastewater, with high catalytic activity, good durability, easy operation and easy recovery, and activation effect of this heterogeneous catalyst is still high even after being used repeatedly, having a great application prospect in degradation of organic pollutants in water.

13 Claims, 2 Drawing Sheets

(51) Int. Cl.
  B01J 37/06 (2006.01)
  B01J 37/08 (2006.01)
  C02F 1/72 (2006.01)
  C02F 101/30 (2006.01)
(52) U.S. Cl.
  CPC ............... *C02F 1/72* (2013.01); *C02F 1/725* (2013.01); *B01J 2531/842* (2013.01); *C02F 2101/30* (2013.01); *C02F 2305/023* (2013.01)

(58) Field of Classification Search
  CPC . C02F 1/725; C02F 2101/30; C02F 2305/023
  See application file for complete search history.

(56) References Cited

FOREIGN PATENT DOCUMENTS

| CN | 105254901 | 1/2016 |
| CN | 105854944 | 8/2016 |

OTHER PUBLICATIONS

Montazerolghaem et al., A metal-organic framework MIL-101 doped with metal nanoparticles (Ni & Cu) and its effect on adsoprtion properties, RSC Adv., 2016, 6, 632-540 (published online on Dec. 9, 2015) (Year: 2015).*

* cited by examiner

COPPER-DOPED IRON METAL-ORGANIC FRAMEWORK, PREPARATION METHOD THEREOF, AND APPLICATION METHOD FOR ACTIVATION OF PERSULFATE TO TREAT ORGANIC WASTEWATER

CROSS-REFERENCE TO RELATED APPLICATION

This application is a 371 application of International PCT application serial no. PCT/CN2016/109351, filed on Dec. 10, 2016, which claims the priority benefit of Chinese application no. 201610207408.5, filed on Mar. 31, 2016. The entirety of each of the above-mentioned patent applications is hereby incorporated by reference herein and made a part of this specification.

TECHNICAL FIELD

The present invention belongs to the technical field of water pollution control, relates to deep oxidation treatment and advanced oxidation process of organic pollutants in water, and in particular, relates to a copper-doped iron metal-organic framework, a preparation method thereof and an application method for activation of persulfate to treat organic wastewater.

BACKGROUND

Water pollution is one of the serious crises facing mankind today, and human beings are constantly developing water pollution control.

However, the treatment of toxic and harmful organic pollutants has always been a technological difficulty to water treatment. The novel advanced oxidation process based on sulfate radical anion ($SO4-.$) has high efficiency and cleanliness in degradation of organic pollutants, so it attracts concern and attention by more and more researchers. In general, persulfate requires the activation of light, heat, ultrasound or metal ions to produce sulfate radical anion, and these activation technologies have some drawbacks and are difficult for practical use. Accordingly, in recent years, processing technology based on activation of persulfate generating sulfate radical anion has received increasing attention, wherein heterogeneous activation technology of persulfate is particularly prominent. Heterogeneous activation technology has high demands on the performances of catalyst. Only a specially prepared catalyst can efficiently activate persulfate to produce active radical. Many researchers have produced metal iron that yields rich into various heterogeneous catalysts, and some researchers mix metal iron and other metals to produce a heterogeneous catalyst for activating persulfate.

Metal-organic frameworks (MOFs) developed in recent years are a kind of crystalline porous material with regular pore or hole structure obtained by coordinate self-assembly of inorganic metal nodes and organic bridging ligands. Such material has a relatively high specific surface area, rich porous structure and high physical and chemical stability and is easy to load other substances without changing its own structure. In addition, the metal-organic framework contains a large amount of unsaturated coordinate metal nodes, which makes it present a great potential application value in many fields, such as catalysis, separation, gas storage, medical diagnosis and so on, and in particular, a great application prospect in the removal of water pollutants. Metal copper-doped iron metal-organic framework serving as heterogeneous catalyst to efficiently activate persulfate, proposed by the present invention, uses the synergistic effect of iron and copper to achieve the purpose of degradation of refractory organics.

SUMMARY OF THE INVENTION

Aiming at the problems of the existing ferrous ion (ferric ion) homogeneous catalyst in activation system of persulfate that the ferrous ions prone to failure, cannot be recycled and produce iron mud, and at drawbacks that some iron-containing heterogeneous catalyst has low activation efficiency and metal loss, the present invention proposes a copper-doped iron metal-organic framework that can effectively solve the above problems, a preparation method thereof, and an application method for activation of persulfate to treat organic wastewater. The present invention adopts the copper-doped iron metal-organic framework as a heterogeneous catalyst, making full use of the unsaturated-coordinate iron active center in the material and the hole-doped copper ions, so that persulfate produces strong oxidizing sulfate radical anion under concerted catalysis of iron and copper, for oxidative degradation of organic pollutants in water. It avoids the loss of ferric ions and copper ions in the homogeneous catalytic system, improves the catalytic utilization rate and improves the water quality environment.

In order to achieve the above object, the present invention adopts following technical solution:

An application method of a copper-doped iron metal-organic framework as a heterogeneous catalyst for activation of persulfate to treat organic pollutants in water, comprises following steps: adding persulfate and the heterogeneous catalyst into water containing organic pollutants at room temperature, causing the persulfate to generate strong oxidizing sulfate radical anion in the presence of the heterogeneous catalyst, the sulfate radical anion further oxidizing refractory organics in water for degradation.

A preparation method of copper-doped iron metal-organic framework, with steps being as follows:

(1) preparation of iron metal-organic framework: dissolving 0.135~0.675 g $FeCl_3.6H_2O$ in 5~25 mL N,N-Dimethylformamide (DMF), and adding 0.041~0.206 g 1,4-benzenedicarboxylic acid (BDC), to obtain a mixture solution, stirring the mixture solution until completely dissolved, then transferring it into a 20~100 mL Teflon-lined high-pressure reactor, putting the high-pressure reactor into a thermostatic blast drying oven for reaction;

(2) after cooling the high-pressure reactor to room temperature, high-speed centrifuging the reaction solution at a speed of 8000~10000 r to obtain a yellow solid, successively washing the solid with absolute ethyl alcohol, then putting it into a vacuum drying oven for drying, to obtain an iron metal-organic framework, labeled as MIL-101(Fe);

(3) preparation of copper-doped iron metal-organic framework: successively weighing $Cu(NO_3)_2.3H_2O$ and citric acid and dissolving them in 100 mL deionized water to obtain a solution, then adding 0.2 g~0.4 g MIL-101(Fe) prepared in step (2) into the solution to obtain a mixture, uniformly mixing the mixture by a magnetic stirrer, then transferring the mixture into the Teflon-lined high-pressure reactor, putting the high-pressure reactor into the thermostatic blast drying oven for reaction;

(4) after cooling the high-pressure reactor to room temperature, high-speed centrifuging using a centrifuge with a speed of 8000~10000 r to obtain a solid, repeatedly washing it with deionized water, until no blue color is found in washing liquid;

(5) processing the material obtained in step (4) in a temperature programming tube furnace, with specific operation being: heating the tube furnace rapidly to 200~280° C. in 25 min~35 min, high-temperature processing the material under the atmosphere of nitrogen;

(6) after cooling the tube furnace to room temperature, taking out the material, with the material being copper-doped iron metal-organic framework, labeled as Cu/MIL-101(Fe), then storing it in a dryer.

Further, the reaction mentioned in step (1) is performed at a temperature of 110° C., with a reaction time being 24 hours.

Further, washing the solid mentioned in step (2) is performed 2 times, 3 hours per wash; said drying is performed at a temperature of 150° C., for 12 hours; and high-temperature processing mentioned in step (5) is performed for 4 hours.

Further, $Cu^{2+}$ in $Cu(NO_3)_2 \cdot 3H_2O$ and MIL-101(Fe) mentioned in step (3) have a mass ratio of 4%, 6%, 8% or 10%; the amount of citric acid is 0.036 g~0.18 g; said stirring is performed for 4 hours; the high-pressure reactor has a volume of 100 mL; and the reaction is performed for 8 hours at 80° C.

A copper-doped iron metal-organic framework prepared by the above-described preparation method.

An application method of the above-described copper-doped iron metal-organic framework for activation of persulfate to treat organic wastewater, with steps being as follows:

adding copper-doped iron metal-organic framework catalyst and persulfate oxidant into the organic wastewater simultaneously, then shaking in a shaker, reacting for 10~240 min at room temperature.

Further, said persulfate is sodium persulfate or potassium persulfate.

Further, a molar ratio between the persulfate oxidant and organic pollutants is (80~140):1.

Further, a dosing quantity of the copper-doped iron metal-organic framework catalyst is 0.1~0.6 g/L.

Further, the shaker has a speed of 50-500 rpm.

The catalyst described above is recycled several times to reflect its maximum catalytic capacity.

Compared with the prior arts, the benefits of the present invention are mainly reflected in the following:

(1) the preparation method of copper-doped iron metal-organic framework provided in the present invention is simple to operate, has no special requirements on the external environment, has relatively strong repeatability, and is easy to achieve;

(2) the iron metal-organic framework has relatively high specific surface area, more porous structures and unsaturated metal active centers, the doping of copper ions increases the reaction point of the material in contact with persulfate, the combined effect of iron and copper reinforces the effect of persulfate generating sulfate radical anion, and the catalyst has good effect on the removal of contaminants;

(3) the heterogeneous catalyst (copper-doped iron metal-organic framework) of the present invention has no selectivity to the target pollutants and has wide applicability;

(4) the heterogeneous catalyst (copper-doped iron metal-organic framework) of the present invention can be recycled and is environmentally friendly, without secondary pollution;

(5) the method of the present invention does not need to consume additional energy, such as ultrasound, light, electricity, etc., reducing the cost; and the technological process is very simple, has strong operability and a broad practical application prospects.

DETAILED DESCRIPTION OF THE PREFERRED EMBODIMENT

The present invention takes dyestuff wastewater as the typical organic wastewater. The dyestuff wastewater affects the visual appearance and contains the large amount of pollutants that are difficult to be biodegraded. Acid dye AO7 is chosen in the following several embodiments as a target pollutant. The present invention is further described below by embodiments, illustrating prominent characteristics and significant progress of the present invention, only intending to explain the present invention but not limit the present invention to the following examples.

Embodiment 1

The present embodiment compared a copper-doped iron metal-organic framework activating sodium persulfate, the copper-doped iron metal-organic framework used alone, an iron metal-organic framework used alone, and sodium persulfate used alone for removal rates of AO7.

Figure 1:
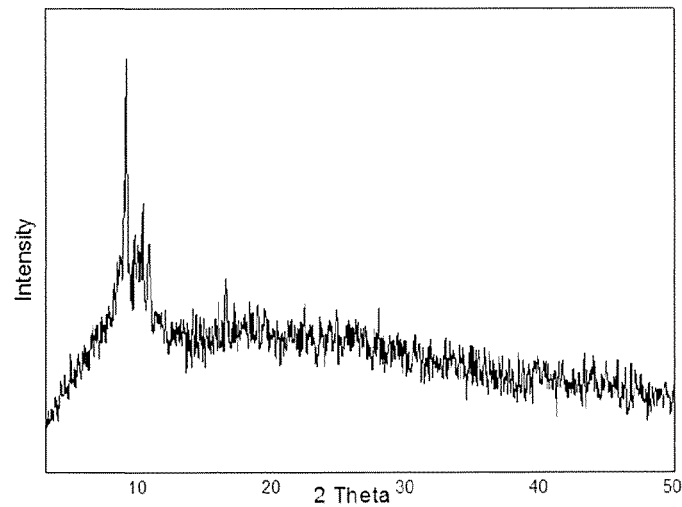
FIG. 1 is an X-ray crystal diffraction pattern of the iron metal-organic framework.

The copper-doped iron metal-organic framework: 0.675 g $FeCl_3 \cdot 6H_2O$ was dissolved in 25 mL N,N-Dimethylformamide (DMF), and 0.206 g 1,4-benzenedicarboxylic acid (BDC) was added, to obtain a mixture solution. The mixture solution was stirred until completely dissolved, then it was transferred into a 100 mL Teflon-lined high-pressure reactor, and then the high-pressure reactor was put into a thermostatic blast drying oven for reaction at 110° C. for 24 hours. After the high-pressure reactor was cooled to room temperature, the reaction solution was high-speed centrifuged at a speed of 8000 r to obtain a yellow solid. The solid was successively washed with absolute ethyl alcohol for 2 times, 3 hours per wash, and then it was put into a vacuum drying oven at 150° C. for drying for 12 hours, to obtain an iron metal-organic framework, labeled as MIL-101(Fe), with an X-ray crystal diffraction pattern being shown in FIG. 1. 0.076 g $Cu(NO_3)_2 \cdot 3H_2O$ and 0.09 g Citric acid were successively weighed and were dissolved in 100 mL deionized water to obtain a solution, and then 0.2 g MIL-101(Fe) was added into the solution to obtain a mixture. The mixture was uniformly mixed by a magnetic stirrer for 4 hours, and then the mixture was transferred into a 100 mL Teflon-lined high-pressure reactor. The high-pressure reactor was put into the thermostatic blast drying oven for reaction at 80° C. for 8 hours. After the high-pressure reactor was cooled to room temperature, the reaction solution was high-speed centrifuged at a speed of 8000 r to obtain a solid. The solid was repeatedly washed with deionized water, until no blue color was found in washing liquid. The above obtained material was processed in a temperature programming tube furnace, with specific operation being: the tube furnace was rapidly heated to 280° C. in 35 min, and the material was high-temperature processed for 4 hours under the atmosphere of nitrogen; after the tube furnace was cooled to room temperature, the material was taken out, with the material being copper-doped iron metal-organic framework, labeled as 10% Cu/MIL-101(Fe), and then it was stored in a dryer for later use.

(1) In a heterogeneous reaction using the copper-doped iron metal-organic framework for activation of sodium persulfate, a conical flask was used as a reactor, and wastewater was 100 mL 0.1 mM/L AO7 solution. 0.02 g copper-doped iron metal-organic framework with copper doping content 10% as a catalyst and 0.1904 g sodium persulfate (molar ratio PS/AO7=80) as an oxidant were added into the reactor simultaneously, and then the conical flask was put into a shaker with a speed of 180 rpm at a temperature of 25° C.

(2) Only the copper-doped iron metal-organic framework in the reaction system (1) was changed to iron metal-organic framework, and the other conditions were the same as the reaction system (1).

(3) Without adding sodium persulfate, the copper-doped iron metal-organic framework was added alone, and the other conditions were the same as the reaction system (1).

(4) Without adding sodium persulfate, the iron metal-organic framework was added alone, and the other conditions were the same as the reaction system (1).

(5) Without adding any catalyst, sodium persulfate was added alone, and the other conditions were the same as the reaction system (1).

The results of the five processes are shown in Table 1:

TABLE 1

| Time min | Removal rate % (1) | Removal rate % (2) | Removal rate % (3) | Removal rate % (4) | Removal rate % (5) |
| --- | --- | --- | --- | --- | --- |
| 0 | 0 | 0 | 0 | 0 | 0 |
| 10 | 4 | 20.1 | 0.4 | 4.7 | 0 |
| 20 | 8.4 | 26 | 0.7 | 5.2 | 0.2 |
| 30 | 12.6 | 32.4 | 0.8 | 6.3 | 0.3 |
| 60 | 17 | 34.2 | 1.1 | 7.4 | 0.6 |
| 90 | 25.6 | 38.4 | 1.4 | 7.7 | 0.6 |
| 120 | 30.8 | 41.5 | 1.6 | 8.4 | 0.7 |
| 180 | 59.7 | 47.8 | 1.7 | 9 | 0.8 |
| 210 | 83.8 | 53.7 | 1.9 | 9.5 | 0.8 |
| 240 | 95.2 | 59.5 | 2.5 | 12.6 | 1 |

The results in Table 1 illustrate that either the catalyst or sodium persulfate alone has weak removal efficiency on AO7. When the catalyst and sodium persulfate were added simultaneously, however, the removal rate of AO7 is significantly increased. It is not difficult to find that in the system where sodium persulfate (0.1904 g) presents, the catalytic effect of the added copper-doped iron metal-organic framework is far superior to that of the iron metal-organic framework. For example, at 180 min, the former is 59.7% while the latter is 47.8%. At 240 min, the removal rate of the former is higher than 95%, while the latter is less than 60%.

Embodiment 2

The present embodiment compared sodium persulfate activated at different copper doping amounts (10%, 8%, 6%, 4%) for removal rates of AO7.

The copper-doped iron metal-organic framework: 0.135 g $FeCl_3 \cdot 6H_2O$ was dissolved in 5 mL N,N-Dimethylformamide, and 0.041 g 1,4-benzenedicarboxylic acid was added, to obtain a mixture solution. The mixture solution was stirred until completely dissolved, then it was transferred into a 20 mL Teflon-lined high-pressure reactor, and then the high-pressure reactor was put into a thermostatic blast drying oven for reaction at 110° C. for 24 hours. After the high-pressure reactor was cooled to room temperature, the reaction solution was high-speed centrifuged at a speed of 10000 r to obtain a yellow solid. The solid was successively washed with absolute ethyl alcohol for 2 times, 3 hours per wash, and then it was put into a vacuum drying oven at 150° C. for drying for 12 hours, to obtain an iron metal-organic framework, labeled as MIL-101(Fe). 0.030 g~0.152 g $Cu(NO_3)_2 \cdot 3H_2O$ and 0.036 g~0.18 g Citric acid were successively weighed and were dissolved in 100 mL deionized water to obtain a solution, and then 0.4 g MIL-101(Fe) was added into the solution to obtain a mixture. The mixture was uniformly mixed by a magnetic stirrer for 4 hours, and then the mixture was transferred into a 100 mL Teflon-lined high-pressure reactor. The high-pressure reactor was put into the thermostatic blast drying oven for reaction at 80° C. for 8 hours. After the high-pressure reactor was cooled to room temperature, the reaction solution was high-speed centrifuged at a speed of 10000 r to obtain a solid. The solid was repeatedly washed with deionized water, until no blue color was found in washing liquid. The above obtained material was processed in a temperature programming tube furnace, with specific operation being: the tube furnace was rapidly heated to 200° C. in 25 min, and the material was high-temperature processed for 4 hours under the atmosphere of nitrogen; after the tube furnace was cooled to room temperature, the material was taken out, with the material being copper-doped iron metal-organic framework, labeled as Cu/MIL-101(Fe), and then it was stored in a dryer for later use.

(1) As for 10% Cu/MIL-101(Fe), a conical flask was used as a reactor, and wastewater was 100 mL 0.1 mM/L AO7 solution. 0.02 g 10% copper-doped iron metal-organic framework and 0.238 g sodium persulfate (molar ratio PS/AO7=100) were added into the reactor simultaneously, and then the conical flask was put into a shaker with a speed of 180 rpm at a temperature of 25° C.

(2) As for 8% Cu/MIL-101(Fe), the added catalyst was 0.02 g 8% copper-doped iron metal-organic framework, and the other conditions were consistent with the reaction system (1).

(3) As for 6% Cu/MIL-101(Fe), the added catalyst was 0.02 g 6% copper-doped iron metal-organic framework, and the other conditions were consistent with the reaction system (1).

(4) As for 4% Cu/MIL-101(Fe), the added catalyst was 0.02 g 4% copper-doped iron metal-organic framework, and the other conditions were consistent with the reaction system (1).

The results of the four processes are shown in Table 2:

TABLE 2

| Time min | Removal rate %(10%) | Removal rate %(8%) | Removal rate %(6%) | Removal rate %(4%) |
| --- | --- | --- | --- | --- |
| 0 | 0 | 0 | 0 | 0 |
| 10 | 5.3 | 10.2 | 10.6 | 20.9 |
| 20 | 10.3 | 13.9 | 15.5 | 27.1 |
| 30 | 14.3 | 22.8 | 25.6 | 30.8 |
| 60 | 23.2 | 35.1 | 34.9 | 44.4 |
| 90 | 32.9 | 44.8 | 49.6 | 61.9 |
| 120 | 43.5 | 59.4 | 62.7 | 77.9 |
| 150 | 49.8 | 66.7 | 78.5 | 90.0 |
| 165 | 57.4 | 70.5 | 83.4 | 93.5 |
| 180 | 67.1 | 78.9 | 85.7 | 94.9 |
| 195 | 78.4 | 85 | 87.9 | 97.8 |
| 210 | 91.7 | 94.2 | 99.4 | 99.6 |

The results in Table 2 illustrate that the four doping amounts have good removal efficiency on AO7. However, with the increasing copper doping amount, the removal rate of AO7 is slower. For example, at 180 min, removal rates corresponding to 4%, 6%, 8% and 10% copper doping amount is 94.9%, 85.7%, 78.9 and 67.1%, respectively. This may be due to the greater copper doping amount, the more copper ions into the pore of the iron metal-organic framework, thereby reducing the pore gap, affecting the reaction contact area, and thus delays the reaction rate. However, with the increase of reaction time, removal rates of AO7 of the four doping amounts all reach 90%. This table shows that the 4% copper doping amount has the best treatment effect.

Embodiment 3

The present embodiment used 10% copper-doped iron metal-organic framework as a catalyst, and compared the catalyst for removal rates of AO7 at different molar ratios of $Na_2S_2O_8$ and AO7 ($Na_2S_2O_8$/AO7=80, 100, 120, 140).

The copper-doped iron metal-organic framework: 0.27 g $FeCl_3 \cdot 6H_2O$ was dissolved in 5 mL N,N-Dimethylformamide, and 0.082 g 1,4-benzenedicarboxylic acid was added, to obtain a mixture solution. The mixture solution was stirred until completely dissolved, then it was transferred into a 40 mL Teflon-lined high-pressure reactor, and then the high-pressure reactor was put into a thermostatic blast drying oven for reaction at 110° C. for 24 hours. After the high-pressure reactor was cooled to room temperature, a centrifuge with a speed of 9000 r was used for high-speed centrifuging to obtain a yellow solid. The solid was successively washed with absolute ethyl alcohol for 2 times, 3 hours per wash, and then it was put into a vacuum drying oven at 150° C. for drying for 12 hours, to obtain an iron metal-organic framework, labeled as MIL-101(Fe). 0.152 g $Cu(NO_3)_2 \cdot 3H_2O$ and 0.18 g Citric acid were successively weighed and were dissolved in 100 mL deionized water to obtain a solution, and then 0.4 g MIL-101(Fe) was added into the solution to obtain a mixture. The mixture was uniformly mixed by a magnetic stirrer for 4 hours, and then the mixture was transferred into a 100 mL Teflon-lined high-pressure reactor. The high-pressure reactor was put into a thermostatic blast drying oven for reaction at 80° C. for 8 hours. After the high-pressure reactor was cooled to room temperature, a centrifuge with a speed of 9000 r was used for high-speed centrifuging to obtain a solid. The solid was repeatedly washed with deionized water, until no blue color was found in washing liquid. The above obtained material was processed in a temperature programming tube furnace, with specific operation being: the tube furnace was rapidly heated to 200° C. in 25 min, and the material was high-temperature processed for 4 hours under the atmosphere of nitrogen; after the tube furnace was cooled to room temperature, the material was taken out, with the material being copper-doped iron metal-organic framework, labeled as 10% Cu/MIL-101(Fe), and then it was stored in a dryer for later use.

(1) A conical flask was used as a reactor, and wastewater was 100 mL 0.1 mM/L AO7 solution. 0.02 g 10% copper-doped iron metal-organic framework and 0.1904 g sodium persulfate (molar ratio PS/AO7=80) were added into the reactor simultaneously, and then the conical flask was put into a shaker with a speed of 180 rpm at a temperature of 25° C.

(2) 0.238 g ($Na_2S_2O_8$/AO7=100) sodium persulfate was added, and the other conditions were the same as the reaction system (1).

(3) 0.2856 g ($Na_2S_2O_8$/AO7=120) sodium persulfate was added, and the other conditions were the same as the reaction system (1).

(4) 0.3332 g ($Na_2S_2O_8$/AO7=140) sodium persulfate was added, and the other conditions were the same as the reaction system (1).

The results of the four processes are shown in Table 3.

TABLE 3

| Time min | Removal rate %(80) | Removal rate %(100) | Removal rate %(120) | Removal rate %(140) |
|---|---|---|---|---|
| 0 | 0 | 0 | 0 | 0 |
| 10 | 3.2 | 5.8 | 6.4 | 8.5 |
| 20 | 6.8 | 7 | 7.8 | 11.7 |
| 30 | 12.7 | 11.1 | 12 | 14.6 |
| 60 | 17 | 18.6 | 17.7 | 19 |
| 90 | 23.1 | 25.4 | 25.6 | 28.3 |
| 120 | 29 | 38.4 | 33.8 | 30 |
| 135 | 38.3 | 49.5 | 46 | 38.5 |
| 150 | 50.8 | 58.2 | 59.8 | 51.2 |
| 165 | 58.1 | 69.3 | 71.9 | 68.8 |
| 180 | 64.6 | 78.3 | 82.4 | 78.3 |
| 210 | 84 | 93.5 | 90.1 | 91.2 |

According to Table 3, it can be seen that when $Na_2S_2O_8$/AO7=80, its removal rate is obviously lower than the other three cases, and when $Na_2S_2O_8$/AO7=100, 120, 140, their removal rates are almost equivalent. For example, when the reaction time is 165 min, the removal rates of AO7 are about 70%; when the reaction time is 210 min, the removal rates AO7 reach more than 90%. Considering the catalytic effect of catalyst and the dosing cost of the drug, $Na_2S_2O_8$/AO7=100 is the best choice.

Embodiment 4

The present embodiment used 6% copper-doped iron metal-organic framework as a catalyst, and compared the catalyst for removal rates of AO7 at different catalyst dosing quantities.

Figure 2:
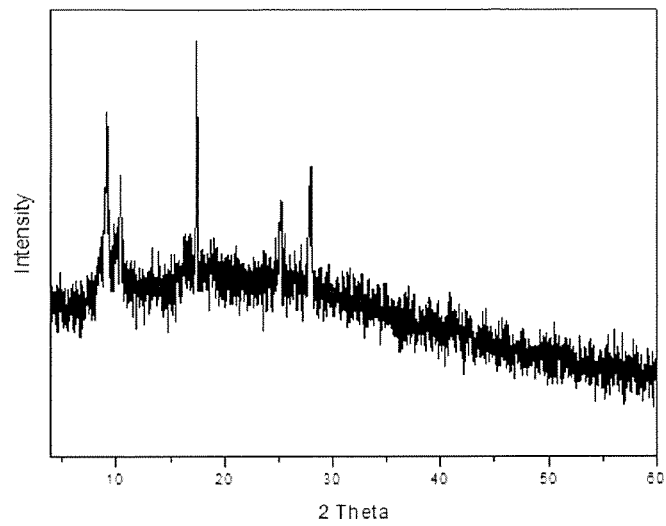
FIG. 2 is an X-ray crystal diffraction pattern of the 6% copper-doped iron metal-organic framework.

The copper-doped iron metal-organic framework: 0.675 g $FeCl_3 \cdot 6H_2O$ was dissolved in 25 mL N,N-Dimethylformamide, and 0.206 g 1,4-benzenedicarboxylic acid was added, to obtain a mixture solution. The mixture solution was stirred until completely dissolved, then it was transferred into a 100 mL Teflon-lined high-pressure reactor, and then the high-pressure reactor was put into a thermostatic blast drying oven for reaction at 110° C. for 24 hours. After the high-pressure reactor was cooled to room temperature, a centrifuge with a speed of 8000 r was used for high-speed centrifuging to obtain a yellow solid. The solid was successively washed with absolute ethyl alcohol for 2 times, 3 hours per wash, and then it was put into a vacuum drying oven at 150° C. for drying for 12 hours, to obtain an iron metal-organic framework, labeled as MIL-101(Fe). 0.045 g $Cu(NO_3)_2 \cdot 6H_2O$ and 0.054 g Citric acid were successively weighed and were dissolved in 100 mL deionized water to obtain a solution, and then 0.2 g MIL-101(Fe) was added into the solution to obtain a mixture. The mixture was uniformly mixed by a magnetic stirrer for 4 hours, and then the mixture was transferred into a 100 mL Teflon-lined high-pressure reactor. The high-pressure reactor was put into a thermostatic blast drying oven for reaction at 80° C. for 8 hours. After the high-pressure reactor was cooled to room temperature, a centrifuge with a speed of 8000 r was used for high-speed centrifuging to obtain a solid. The solid was repeatedly washed with deionized water, until no blue color was found in washing liquid. The above obtained material was processed in a temperature programming tube furnace, with specific operation being: the tube furnace was rapidly heated to 240° C. in 30 min, and the material was high-temperature processed for 4 hours under the atmosphere of nitrogen; after the tube furnace was cooled to room temperature, the material was taken out, with the material being copper-doped iron metal-organic framework, labeled as 6% Cu/MIL-101(Fe), having an X-ray crystal diffraction pattern as shown in FIG. 2, and then it was stored in a dryer for later use.

(1) A conical flask was used as a reactor, and wastewater was 100 mL 0.1 mM/L AO7 solution. 0.01 g 6% copper-doped iron metal-organic framework and 0.238 g sodium persulfate were added into the reactor simultaneously, and then the conical flask was put into a shaker with a speed of 180 rpm at a temperature of 25° C.

(2) 0.02 g 6% copper-doped iron metal-organic framework was added, and the other conditions were consistent with the reaction system (1).

(3) 0.04 g 6% copper-doped iron metal-organic framework was added, and the other conditions were consistent with the reaction system (1).

(4) 0.06 g 6% copper-doped iron metal-organic framework was added, and the other conditions were consistent with the reaction system (1).

The results of the four processes are shown in Table 4.

TABLE 4

| Time min | Removal rate % (0.01 g) | Removal rate % (0.02 g) | Removal rate % (0.04 g) | Removal rate % (0.06 g) |
|---|---|---|---|---|
| 0 | 0 | 0 | 0 | 0 |
| 10 | 8.5 | 13.3 | 23.6 | 32.3 |
| 20 | 11.8 | 16.5 | 31.6 | 60.5 |
| 30 | 15.9 | 26.1 | 42 | 74.4 |
| 60 | 21.3 | 42.6 | 67.1 | 86.6 |
| 90 | 27.5 | 47.9 | 82.9 | 96.1 |
| 120 | 31.9 | 57.4 | 94.6 | 95.9 |
| 150 | 38 | 74.2 | 96.1 | 96.4 |
| 180 | 43.7 | 89.4 | / | / |
| 210 | 51.2 | 97.8 | / | / |

It can be seen from Table 4 that, with the increasing catalyst dosing quantity, the rate of removal of AO7 is faster, the removal efficiency is also better. For example, at 150 min, removal rates corresponding to 0.01g, 0.02g, 0.04 g and 0.06 g catalyst are 38%, 74.2%, 96.1% and 96.4%, respectively.

Embodiment 5

The present embodiment used 8% copper-doped iron-based-metal-organic framework as a catalyst, and studied the influence of the number of recycle of the catalyst on removal rate of AO7.

Figure 3:
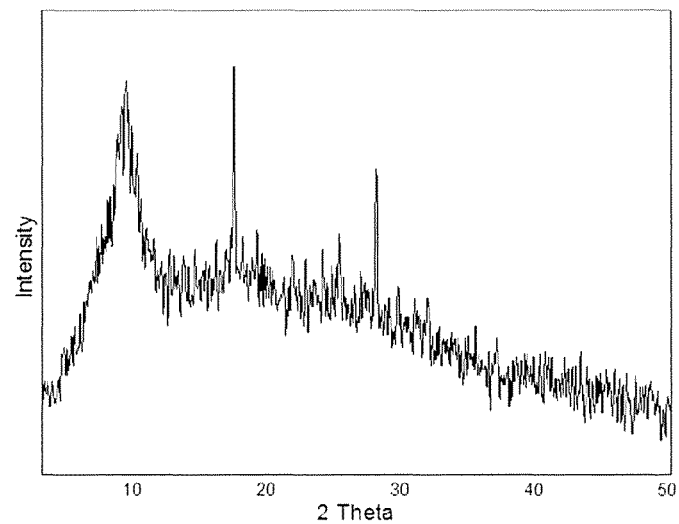
FIG. 3 is an X-ray crystal diffraction pattern of the 8% copper-doped iron metal-organic framework.

The copper-doped iron metal-organic framework: 0.675 g $FeCl_3 \cdot 6H_2O$ was dissolved in 25 mL N,N-Dimethylformamide, and 0.206 g 1,4-benzenedicarboxylic acid was added, to obtain a mixture solution. The mixture solution was stirred until completely dissolved, then it was transferred into a 100 mL Teflon-lined high-pressure reactor, and then the high-pressure reactor was put into a thermostatic blast drying oven for reaction at 110° C. for 24 hours. After the high-pressure reactor was cooled to room temperature, a centrifuge with a speed of 8000 r was used for high-speed centrifuging to obtain a yellow solid. The solid was successively washed with absolute ethyl alcohol for 2 times, 3 hours per wash, and then it was put into a vacuum drying oven at 150° C. for drying for 12 hours, to obtain an iron metal-organic framework, labeled as MIL-101(Fe). 0.09 g $Cu(NO_3)_2 \cdot 6H_2O$ and 0.108 g Citric acid were successively weighed and were dissolved in 100 mL deionized water to obtain a solution, and then 0.3 g MIL-101(Fe) was added into the solution to obtain a mixture. The mixture was uniformly mixed by a magnetic stirrer for 4 hours, and then the mixture was transferred into a 100 mL Teflon-lined high-pressure reactor. The high-pressure reactor was put into a thermostatic blast drying oven for reaction at 80° C. for 8 hours. After the high-pressure reactor was cooled to room temperature, a centrifuge with a speed of 10000 r was used for high-speed centrifuging to obtain a solid. The solid was repeatedly washed with deionized water, until no blue color was found in washing liquid. The above obtained material was processed in a temperature programming tube furnace, with specific operation being: the tube furnace was rapidly heated to 200° C. in 25 min, and the material was high-temperature processed for 4 hours under the atmosphere of nitrogen; after the tube furnace was cooled to room temperature, the material was taken out, with the material being copper-doped iron metal-organic framework, labeled as Cu/MIL-101(Fe), and then it was stored in a dryer for later use. An X-ray crystal diffraction pattern of the material is shown in FIG. 3.

(1) A conical flask was used as a reactor, and wastewater was 100 mL 0.1 mM/L AO7 solution. 0.02 g 8% copper-doped iron metal-organic framework and 0.238 g potassium persulfate were added into the reactor simultaneously, and then the conical flask was put into a shaker with a speed of 180 rpm at a temperature of 25° C. Samples were taken at corresponding time points at 0, 30, 60, 90, 120, 150 and 180 min, respectively.

(2) after step (1), the catalyst in the conical flask was high-speed centrifuged, dried in a drying oven at 60° C., and then put into 100 mL 0.1 mM/L AO7 solution. The other conditions were the same as the reaction system (1).

(3) The catalyst was subjected to four recycles according to the method in the reaction system (1) and the reaction system (2), and its results of removal rate of AO7 was shown in Table 5.

TABLE 5

| Time min | Removal rate % (first time) | Removal rate % (second time) | Removal rate % (third time) | Removal rate % (fourth time) |
|---|---|---|---|---|
| 0 | 0 | 0 | 0 | 0 |
| 30 | 0 | 28.1 | 19.5 | 15.7 |
| 60 | 34.1 | 43.9 | 33.5 | 22.6 |
| 90 | 46.6 | 58 | 58.2 | 42.9 |
| 120 | 75.8 | 72.7 | 77.1 | 65 |
| 150 | 85.8 | 83.7 | 85.1 | 78.1 |
| 180 | 96 | 91.4 | 90.2 | 86 |

The results in Table 5 illustrate that the catalytic effect is still high even the catalyst has been subjected to four recycles. For example, at 180 min, the removal rates corresponding to the first, second, third and fourth times are 96%, 91.4%, 90.2% and 86.0%, respectively. The experiment shows that the copper-doped iron metal-organic framework has good reusability and provides the possibility of using the catalyst in the practical application of wastewater.

What is claimed is:

1. A preparation method of copper-doped iron metal-organic framework, characterized in that, steps are as follows:

(1) preparation of iron metal-organic framework: dissolving 0.135~0.675 g $FeCl_3 \cdot 6H_2O$ in 5~25 mL N,N-

Dimethylformamide, and adding 0.041~0.206 g 1,4-benzenedicarboxylic acid, to obtain a mixture solution, stirring the mixture solution until completely dissolved, then transferring the mixture solution into a 20~100 mL fluoropolymer-lined high-pressure reactor, putting the high-pressure reactor into a thermostatic blast drying oven for reaction;

(2) after cooling the high-pressure reactor to room temperature, high-speed centrifuging the reaction solution at a speed of 8000~10000 r to obtain a yellow solid, successively washing the yellow solid with absolute ethyl alcohol, then putting the yellow solid into a vacuum drying oven for drying, to obtain an iron metal-organic framework, labeled as MIL-101(Fe);

(3) preparation of copper-doped iron metal-organic framework: successively weighing $Cu(NO_3)_2 \cdot 3H_2O$ and citric acid and dissolving them in 100 mL deionized water to obtain a solution, then adding 0.2~0.4 g of the MIL-101(Fe) prepared in step (2) into the solution to obtain a mixture, uniformly mixing the mixture by a magnetic stirrer, then transferring the mixture into the fluoropylmer-lined high-pressure reactor, putting the high-pressure reactor into the thermostatic blast drying oven for reaction;

(4) after cooling the high-pressure reactor to room temperature, high-speed centrifuging the reaction solution at a speed of 8000~10000 r to obtain a solid, repeatedly washing the solid with deionized water, until no blue color is found in washing liquid; (5) processing the material obtained in step (4) in a temperature programming tube furnace, with specific operation being: heating the tube furnace rapidly to 200~280° C. in 25 minutes~35 minutes, high-temperature processing the material under the atmosphere of nitrogen;

(6) after cooling the tube furnace to room temperature, taking out the material, with the material being copper-doped iron metal-organic framework, labeled as Cu/MIL-101(Fe), then storing the Cu/MIL-101(Fe) in a dryer.

2. The preparation method of copper-doped iron metal-organic framework according to claim 1, wherein the reaction mentioned in step (1) is performed at a temperature of 110° C., with a reaction time being 24 hours.

3. The preparation method of copper-doped iron metal-organic framework according to claim 1, wherein washing the solid mentioned in step (2) is performed for 2 times, 3 hours per wash; the drying in the vacuum drying oven is performed at a temperature of 150° C., for 12 hours; and the high-temperature processing mentioned in step (5) is performed for 4 hours.

4. The preparation method of copper-doped iron metal-organic framework according to claim 1, wherein $Cu^{2+}$ in the $Cu(NO_3)_2 \cdot 3H_2O$ and the MIL-101(Fe) mentioned in step (3) have a mass ratio of 4%, 6%, 8% or 10%; the amount of citric acid is 0.036 g~0.18 g; the stirring is performed for 4 hours; the high-pressure reactor has a volume of 100 mL; and the reaction is performed for 8 hours at 80° C.

5. A copper-doped iron metal-organic framework prepared by the preparation method according to claim 1.

6. A copper-doped iron metal-organic framework prepared by the preparation method according to claim 2.

7. A copper-doped iron metal-organic framework prepared by the preparation method according to claim 3.

8. A copper-doped iron metal-organic framework prepared by the preparation method according to claim 4.

9. An application method of the copper-doped iron metal-organic framework according to claim 5 for activation of persulfate to treat organic wastewater, characterized in that, steps are as follows:
adding copper-doped iron metal-organic framework catalyst and persulfate oxidant into the organic wastewater simultaneously, then shaking in a shaker, reacting for 10 minutes~240 minutes at room temperature.

10. The application method of the copper-doped iron metal-organic framework for activation of persulfate to treat organic wastewater according to claim 9, wherein the persulfate is sodium persulfate or potassium persulfate.

11. The application method of the copper-doped iron metal-organic framework for activation of persulfate to treat organic wastewater according to claim 9, wherein a molar ratio between the persulfate oxidant and organic pollutants is (80~140):1.

12. The application method of the copper-doped iron metal-organic framework for activation of persulfate to treat organic wastewater according to claim 9, wherein a dosing quantity of the copper-doped iron metal-organic framework catalyst is 0.1~0.6 g/L.

13. The application method of the copper-doped iron metal-organic framework for activation of persulfate to treat organic wastewater according to claim 9, wherein the shaker has a speed of 50-500 rpm.

* * * * *